(12) United States Patent
Antti

(10) Patent No.: US 7,120,422 B2
(45) Date of Patent: Oct. 10, 2006

(54) METHOD, ELEMENT AND SYSTEM FOR SECURING COMMUNICATION BETWEEN TWO PARTIES

(75) Inventor: Huima Antti, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/924,863

(22) Filed: Aug. 8, 2001

(65) Prior Publication Data

US 2002/0077078 A1 Jun. 20, 2002

Related U.S. Application Data

(63) Continuation of application No. PCT/EP00/01061, filed on Feb. 10, 2000.

(30) Foreign Application Priority Data

Feb. 11, 1999 (GB) .................................. 9903123.9

(51) Int. Cl.
*H04M 3/16* (2006.01)
*H04K 1/00* (2006.01)
(52) U.S. Cl. .................... 455/411; 455/410; 380/270
(58) Field of Classification Search ................ 455/410, 455/411, 435, 433, 445, 435.1; 370/331, 370/328, 338; 380/247, 248, 270, 250, 23, 380/25; 379/189, 161, 168, 164, 194
See application file for complete search history.

(56) References Cited

U.S. PATENT DOCUMENTS

| | | | | |
|---|---|---|---|---|
| 5,153,919 A | * | 10/1992 | Reeds et al. .................... 380/44 |
| 5,199,070 A | * | 3/1993 | Matsuzaki et al. ............. 380/30 |
| 5,467,382 A | * | 11/1995 | Schorman .................... 455/410 |
| 5,537,474 A | * | 7/1996 | Brown et al. ................ 380/248 |
| 5,557,654 A | * | 9/1996 | Maenpaa ..................... 455/411 |
| 5,596,641 A | * | 1/1997 | Ohashi et al. ............... 380/248 |
| 5,642,401 A | * | 6/1997 | Yahagi ........................ 455/411 |
| 5,689,563 A | * | 11/1997 | Brown et al. ................ 380/247 |
| 5,909,491 A | * | 6/1999 | Luo ............................ 380/270 |
| 5,991,407 A | * | 11/1999 | Murto ......................... 380/248 |
| 6,081,601 A | * | 6/2000 | Raivisto ...................... 380/270 |
| 6,094,487 A | * | 7/2000 | Butler et al. ................. 380/270 |
| 6,115,601 A | * | 9/2000 | Ferreira ....................... 455/406 |
| 6,201,871 B1 | * | 3/2001 | Bostley et al. .............. 380/249 |
| 6,427,073 B1 | * | 7/2002 | Kortesalmi et al. ....... 455/414.1 |

FOREIGN PATENT DOCUMENTS

| | | |
|---|---|---|
| EP | 0602335 A2 | 6/1994 |
| EP | 0602335 A3 | 6/1994 |
| WO | WO 97/47109 | 12/1997 |

OTHER PUBLICATIONS

Refik Molva, Didier Samfat and Gene Tsudik; "Authentication of Mobile Users", IEEE Network: The Magazine of Computer Communications, vol. 8, No. 2, Mar. 1994, pp. 26-34.
Chang-Seop Park; "On Certificate-Based Security Protocols for Wireless Mobile Communication Systems", IEEE Network: The Magazine of Computer Communications, vol. 11, No. 5, Sep. 1997, pp. 50-55.
International Search Report for PCT/EP00/01061.

* cited by examiner

*Primary Examiner*—Tilahun Gesesse
(74) *Attorney, Agent, or Firm*—Squire, Sanders & Dempsey L.L.P.

(57) ABSTRACT

A method of securing communication between a first party and a second party includes defining a criteria for selecting one of a plurality of different security methods. One of the plurality of different security methods is selected in accordance with the defined criteria.

36 Claims, 5 Drawing Sheets

METHOD, ELEMENT AND SYSTEM FOR SECURING COMMUNICATION BETWEEN TWO PARTIES

This application is a continuation of international application serial number PCT/EP00/01061, filed 10 Feb. 2000.

The present invention relates to a method of securing communication between a first and a second party and in particular but not exclusively to a method which can be used in a wireless communications.

A typical cellular wireless network 1 is shown in FIG. 1. The area covered by the network is divided into a number of cells 2. Each cell 2 is served by a base transceiver station 4 which transmits signals to and receives signals from terminals 6 located in the respective cell associated with a particular base transceiver station 4. The terminals may be mobile stations which are able to move between cells 2. As the transmission of signals between the terminal 6 and the base transceiver stations 4 is via radio waves, it is possible for unauthorised third parties to receive those signals.

Accordingly, in known wireless cellular networks, authentication is provided to identify the right mobile and ciphering is used to prevent third parties from listening in. Illustrated in FIG. 2 is the procedure carried out in the GSM (Global System for Mobile communications) standard. In the first step S1, the mobile station MS makes a request to a mobile services switching centre (MSSC) via the base station for an outgoing call. A visitor location register (VLR) is informed via the mobile services switching centre of this request. The VLR takes control of the authentication procedure.

Each mobile terminal is provided with an identification number which is sometimes referred to, in a GSM standard, as the IMSI (International Mobile Subscriber Identity) number. The MSSC forwards the mobile's IMSI to the VLR. Information on the IMSI is initially provided by the mobile station. The VLR then sends, in the second step S2, the IMSI together with the identity of the VLR to the home location register HLR of the mobile. This ensures that any incoming calls can be directed to the mobile station at its current location. Once the HLR has received the IMSI, a request is made to an authentication centre AC for the mobile subscriber's ciphering key KI. The ciphering key KI is present at both the authentication station AC as well as the mobile station.

In a third step S3, the authentication centre uses the cipher key KI and a random number to generate a signature SRES and a ciphering key Kc which is used for channelling coding. The random number, the ciphering key Kc and the signature SRES make up a triplet which is only used for a single communication. Each triplet calculated by the authentication centre AC is forwarded to the associated visitor location register VLR and the mobile services switching centre MSSC.

In step S4, the VLR conveys the value of the ciphering key Kc to a base station controller (not shown) and the value of the random number to the mobile station.

The mobile station then calculates a signature SRES based on the same algorithm used by the authentication centre and that signature is, in step S5, transmitted to the VLR. The signature generated in the mobile station is based on the mobile subscribers ciphering key KI and the random number which it receives from the VLR. Authentication is considered to be complete when the signature SRES generated by the mobile station is the same as that generated by the authentication centre AC. Once the authentication procedure has been completed, data which is transmitted is ciphered using the ciphering key Kc and a temporary mobile subscriber identity (TMSI) which is provided by the VLR to the mobile station in encoded form.

It is an aim of embodiments of the present invention to improve the authentication procedure and thus make communications more secure.

According to a first aspect of the present invention, there is provided a method of securing communication between a first party and a second party comprising the steps or: defining a criteria for selecting one of the said plurality of different security methods; selecting said plurality of different security methods in accordance with said defined criteria; and performing said security method.

Thus, a plurality of different security methods are available and one of those security methods can be selected.

Any suitable criteria can be used for selecting the security method to be used. For example, the security method can be selected at random. Alternatively, the security method can be selected based on the processing capability of the first and/or second party. In yet another alternative, the security method can be selected in dependence on the amount of time since the last security method was performed. It is also possible that the security method could be selected on the basis of the function provided by the security method. In yet another alternative, the security method is selected on the basis of the previous security method which has been used.

By having a plurality of different security methods available, it is possible to select the most appropriate security method for the conditions.

The plurality of security methods may comprise at least one authentication method and/or at least one rekeying method. Preferably, the security methods include both authentication and re-keying methods.

Preferably, the at least one authentication method includes a key exchange to create a shared secret. That shared secret can be used in order to ensure that communications between the first and second parties are secure.

A re-keying method may be performed after a authentication method. A re-keying method may be carried out with or without authentication depending on the circumstances.

The plurality of security methods each comprise a plurality of messages selected from a set of messages, at least two different security methods having at least one message in common. By using a common set of messages from which each of the security methods can be performed, it is possible to reduce the number of different messages that are required in order to carry out a number of different security methods. This provides increased versatility in embodiments of the present invention.

The set of messages includes at least one of the following message types:
  at least one random number message;
  at least one hash function message;
  at least one signature function message;
  at least one parameter for use with a given function message;
  at least one security parameter message;
  at least one key for a given function message;
  at least one encoded message;
  at least one message to and/or from at least one third party; and
  at least one authentication response message.

In a preferred embodiment of the present invention, all of these different message types are available from which each of the available security methods can be constructed.

Preferably the set of messages includes the following message types: one signature function message; two security parameter messages; two random number messages; one encoded signature function message; one encoded user identification message; two parameters for use with given function messages; two hash function messages; one contact message with a third party; one response message from the third party; one authentication response message; and two public parameters for the given function.

The set of messages may be as follows:

1. n,g
2. R
3. R'
4. P
5. P'
6. $g^x \bmod n$
7. $g^y \bmod n$
8. hash[SIG 1] (n|g|$g^x$|$g^y$|$g^{xy}$|P|P'|R|R'|B)
9. hash[SIG 2] (n|g|$g^x$|$g^y$|$g^{xy}$|p|p'|R|R'|B|U)
10. $SIG_B$ (hash [SIG1] n|g|$g^x$|$g^y$|$g^{xy}$|P|P'|R|R'|B)
11. $E_K$ ($SIG_u$ (hash[SIG2] (n|g|$g^x$|$g^y$|$g^{xy}$|P|p'|R|R'|↑B|U))
12. $E_k$ ($S_u$)
13. hash[AUTH] (n|g|$g^{xy}$ mod n|R|R'|B|U), U
14. hash[RESP] (hash[SEC]S| hash[AUTH] (n|g|$g^{xy}$ mod n|R|R'|B|U))
15. hash[SEC] (S| hash[AUTH] (n|g|$g^{xy}$ mod n|R|R'|B|U))

where n and g are Diffie Hellman public parameters, R and R' are random numbers, P and P' are security parameters, g is a generator of the Diffie Hellman exchange, x and y are random exponents, n is the modulus of the Diffie Hellman key exchange, B and U are the identity of the first and second parties, SIG represents a signature, $E_k$ represents encryption, AUTH represents authentication.

A first security method may use the following messages: the first and second keys for a given function message; first and second random number messages, first and second security parameter messages, a signature function message, one encoded user identification message and optionally at least two parameters for use with a given function message.

A second security method may use first and second random number messages, first and second security parameter messages, first and second keys for a given function messages, a signature function message and optionally first and second parameters for use with the given function message.

A third security method may use first and second random number messages, first and second security parameter messages, first and second keys for given function message, one encoded user identification message, one message to and one message from a third party, one authentication response message and optionally first and second parameters for use with a given function message.

A first rekeying method may comprise first and second random number messages.

A second rekeying method may be provided which uses first and second random number messages and first and second hash function messages.

A third rekeying method may be provided which has first and second random number messages, a signature function message and an encoded message.

A fourth rekeying method may be provided which comprises the use of first and second random number messages, one message to and one message from the third party and one authentication response message.

The plurality of security methods may include one or more of the first to third security methods and/or one or more of the first to fourth rekeying methods.

The given function is preferably a Diffie-Hellman function. At least one of the message types comprises two messages, in a preferred embodiment of the invention one message being from the first party and the other message from being the second party. In some embodiments of the present invention, there are preferably several exchanges of messages.

Preferably, the encoded message is used to transfer information as to the identity of at least one of the first and second parties to the other of the first and second parties. In this way, the vulnerability of the communication between the first and second parties to attack can be reduced.

Preferably, at least one of the first and second parties is arranged to communicate with a trusted third party and is arranged to receive messages from and/or send message to that trusted third party. In these methods, the trusted third party may be arranged to deal with messages received from one of the first and second parties and to formulate a reply to those messages.

Preferably, the exchange of messages between the first and second parties permits a shared secret to be created which is used to authenticate the communication between the parties. That shared secret can be used in subsequent communications between the parties in, for example, an enciphering code.

At least one re-keying method may comprise a step of exchanging at least one random number between the first and second parties. In one re-keying method, the random number exchange is sufficient to create a new secure encryption key as, for example, a shared secret may still not be known to a third party. It is preferred that at least one of the random numbers be authenticated.

Preferably, at least one security method comprises the steps of receiving one of the first and second parties a message, generating at said one party the message which the one party expects to receive and comparing the received and generated messages and if the messages are the same authenticating the other party.

Embodiments of the present invention can be used in a telecommunications network which may be a wired or a wireless network. In the case of a wireless network, at least one of the first and second stations may be a mobile station. Likewise, at least one of the first and second stations may be a base station.

For a better understanding of the present invention and as to how the same may be carried into effect, reference will now be made by way of example to the accompanying drawings in which.

Figure 1:
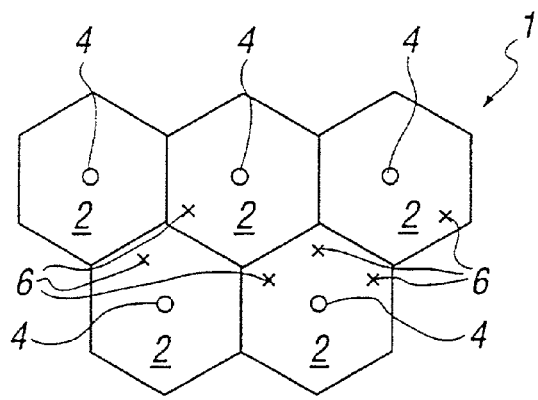
FIG. 1 shows a known cellular network in which embodiments of the present invention can be used.
Figure 2:
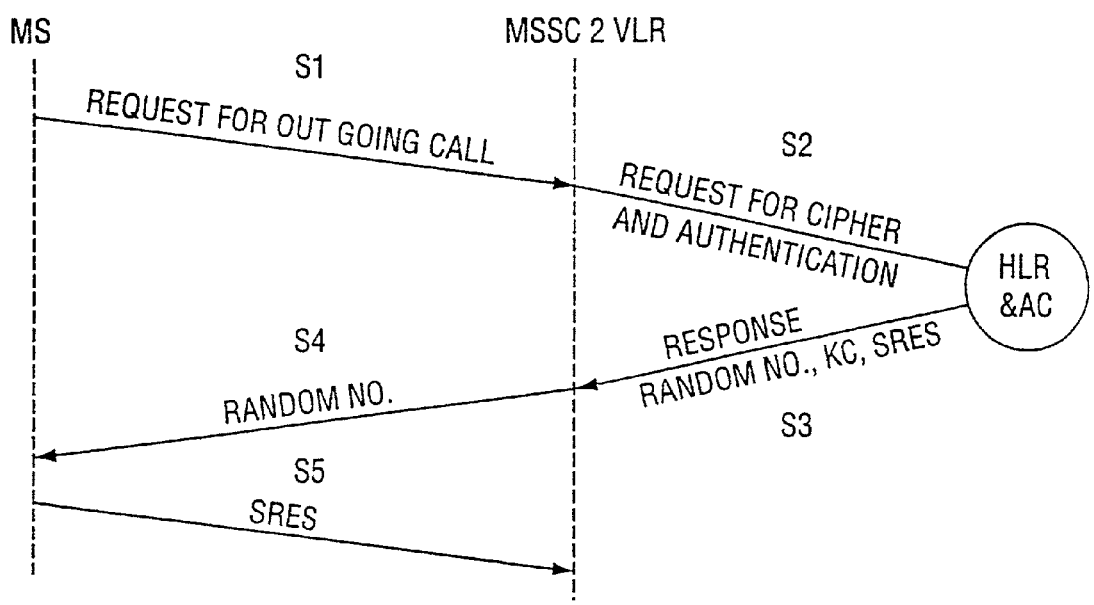
FIG. 2 shows a known authentication protocol.

In order to assist with the understanding of embodiments of the present invention, a summary of some of the abbreviations used is now provided.

U UMTS (Universal Mobile Telecommunication Service) user identity, sometimes referred to as IMUI (International Mobile User Identity). In other words, U represents the identity of the mobile station.

n modulus of Diffie-Hellman key exchange and is typically a large prime number. In other words, this represents the modular arithmetic which is used. Modular arithmetic is a circular type of counting so that for any results obtained, the results themselves are not used. Instead the remainder when divided by the modulus n is used.

g generator of Diffie-Hellman key exchange. g can be any suitable integer between 2 and n−1 inclusive.

x, y random exponents used in the Diffie-Hellman key exchange. In other words, g is raised to the power of x and/or y.

R, R' random numbers, also referred to as nonces. Typically these random numbers are changed regularly.

P, P' security parameters—which include information as to the available ciphers, hash functions etc.

$SIG_A$ (φ) signature SIG of φ by A's signature key.

$E_k$ (φ) φ encrypted using key k.

hash [X] (φ) parametrized hash function with a constant parameter X. In other words, the hash function varies in accordance with a given parameter X. The value of the parameter can of course vary.

φ|X concatenation (i.e. putting two items together one after the other) of φ and X.

φ, X concatenation of φ and X.

Embodiments of the present invention use signature functions SIG having the following features. $SIG_A$ (φ) should only be computable by A and principals authorised by A only, assuming that φ has previously been chosen and φ has not previously been signed. In order for the signature function $SIG_A$ (φ) for a previously chosen φ, to be effective against unauthorised persons, the complexity of the problem confronting an unauthorised person should be $2^{160}$ or greater. Additionally, the signature should be verifiable by all parties who possess the corresponding verification function. The verification function is sometimes referred to as the verification key.

If X is a suitable parameter for the parametized hash function used in the protocols described hereinafter, the following features will be provided by the hash function. The length of the returned value of the hash function should be at least 160 bits in order to prevent birthday attacks. In other words, the likelihood of hash X equalling hash Y is low so the probability of a third party being able to obtain access by trying out some of the possible values is very small. The function should be a one way keyed function. The hash function should have a large domain i.e. set of possible values whose size is equal to $2^l$ where l is at least 160. The amount of work required to compute the value of y from hash [X] (y)=z if z is known should have an order of complexity equal to $2^l$ where l is the length of the output of the hash function in bits and l is at least 160. Knowing the value of z should not put the attacker in a better position to determine hash [x] (i) than if he did not know that value. If the value of the function hash [X] (S|$y_i$) is known for i which belongs to the set 1, 2, . . . K, and $y_i$ is known but it is only known that S is only one possible value, then the probability of being able to guess the value for hash [X] (S|x) for some x should be 1/O (min($2^l$, |Q|)) where O represents order of and Q is the set from which a particular value of the secret S used in the keyed hash function is picked from. For example, if the secret S used in the keyed hash function is a 40 bit random number then Q is the set of all 40-bit random numbers. |Q| represents the size of the set. "min" selects the minimum of $2^l$ and |Q|. X determines the hash function and because X only determines the functions used it does not need to be secret. Indeed, the parameters X may be publicly known and fixed for a long period of time.

The protocols which will be described hereinafter are used to perform key exchange, key reexchange and mutual authentication. In summary, the mobile station MS and the network or base transceiver station BTS perform an initial key exchange protocol in order to obtain a shared secret S as a result of a Diffie-Hellman key exchange. This shared secret S is $g^{xy}$mod n. The parties also exchange a pair of random numbers R, R'. The concatenation of the shared secret S and the two nonces provide the key material. Different keys are derived from key material using different parametrized hash functions. Rekeying is performed by exchanging a new pair of random numbers.

Keys for encrypting further communications can also be created using the following formula: k=hash [T] ($g^{xy}$mod n|R|R') where T is a unique parameter. T can be public or fixed and can be used once or more than once.

During the initial key exchange protocol, security parameters P are exchanged. These security parameters are used to inform the other party about the available ciphers, hash functions etc.

Diffie-Hellman key exchange is a way to establish a shared secret between two parties. When using modular arithmetic, it is very hard to compute the value of x when only $g^X$ is known. Normally, computing x from $g^x$ means computing the logarithm of $g^x$ and this is easy. However, in modular arithmetic the situation changes dramatically; it is not known how to compute x from $g^x$.

In Diffie Hellman key exchange therefore two parties establish a shared secret in the following way. The first party sends "$g^x$". The second party sends "$g^y$". Here x is known only by the first party and y is known only by the second party. However the values $g^x$ and $g^Y$ are public. Now the shared secret s $g^{xy}$. In order to compute $g_{xy}$ you need to know at least one of the values of x and y. For example, if you know x, you can compute $g^{xy}$ as $(g^y)^x$. Computing discrete logarithms i.e. x from $g^x$, is very hard. Accordingly no-one else is able to compute $g^{xy}$ even though the values $g^x$ and $g^Y$ are public.

Figure 3:
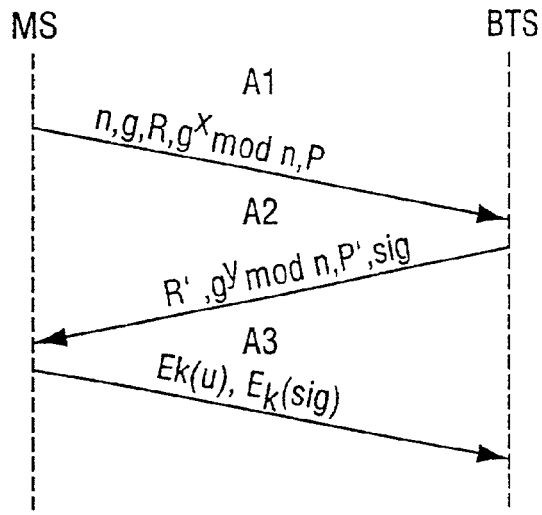
FIG. 3 illustrates a key exchange using signatures embodying the present invention.

Reference will now be made to FIG. 3 which illustrates schematically a key exchange using signatures. The purpose of this key exchange is to create the shared secret S=$g^{xy}$mod n to exchange the random numbers and to authenticate both parties.

In the initial communication, the mobile station MS sends to the base transceiver station a random number R along with public Diffie-Hellman key exchange parameters n and g and the public key $g^x$mod n. The mobile station also sends security parameters P to the base station. This first message from the mobile station MS to the base transceiver station initiates the key exchange and is illustrated in FIG. 3 in step A1.

The second message is sent from the base transceiver station BTS to the mobile station MS and constitutes the second step A2 illustrated in FIG. 3. The base transceiver station sends a random number R' along with another public Diffie-Hellman key $g^Y$mod n and security parameters P' to the mobile station MS. The network then signs the key exchange and random numbers so that the mobile station can ascertain that the exchange went well without being attacked. This particular method prevents attacks known as man in the middle attacks. This is where a third party intercepts transmissions from a mobile station, substitutes information into that communication from the mobile station before transmitting to the base station and likewise intercepting communications for the mobile station which are received from the base station. The shared secret $S=g^{xy}$ mod n must be included in the signature so that the mobile is sure that the base transceiver station knows the shared secret.

The signature $SIG_B$ provided in the second message by the base transceiver station is as follows:

$$SIG_B \; (hash[SIG1] \; (n|g|g^x|g^Y|g^{xy}|P|P'|R|R'|B))$$

B is the identity or the base transceiver station.

A temporary key k is computed from the shared secret and the random numbers. The random numbers are included in the temporary key so that rekeying can occur using the same shared secret Rekeying occurs when a new temporary key is generated. As will be described in more detail hereinafter, rekeying can be achieved by providing new random numbers R and R'. The temporary key k is equal to hash[TKEY] ($g^{xy}$mod n |R|R').

The mobile station carries out a verify function in respect of the signature $SIG_B$. The verify function and the signature function are related so that given the value of the signature function, the verify function provides an accept or reject value. Accept means that the signature is accepted and reject means that the signature is invalid. In other words the mobile station is arranged to verify the signature which it receives.

In step A3, the message which is sent from the mobile station MS to the base transceiver station is encrypted using the temporary key. In the encrypted message, the identity of the mobile user U is included. Thus, the identity of the user U is only sent in an encrypted form. The encrypted identity is represented by $E_k$ (U). Along with the encrypted identity, the mobile station also sends a signature $SIG_U$, similar to that sent from the base transceiver station to the mobile station in step A2. However, that signature is encrypted. The encrypted signature is represented by the following:

$$E_k(SIG_U(hash[SIG2] \; (n|g|g^x|g^Y|g^{xy}|P|P'|R|R'|B|U))).$$

As can be seen, the identity of the mobile user is included in the signature. Encryption of the signature is not essential although the mobile's identity is encrypted and it may be more convenient also to encrypt the signature. It should be appreciated that both of the signatures $SIG_B$ and $SIG_U$ include the signer's identity i.e. B and U respectively and the use of these identities in the signatures is to prevent third parties from stealing the signed hash values and signing them again with different keys. In other words, the inclusion of the identities B and U makes the functions unique to the base station and mobile station respectively.

The base transceiver station verifies the signature received from the mobile station in order to authenticate the mobile user in the same way that the mobile station verifies the base station. This may require a connection to the service provider of the mobile user.

Figure 4:
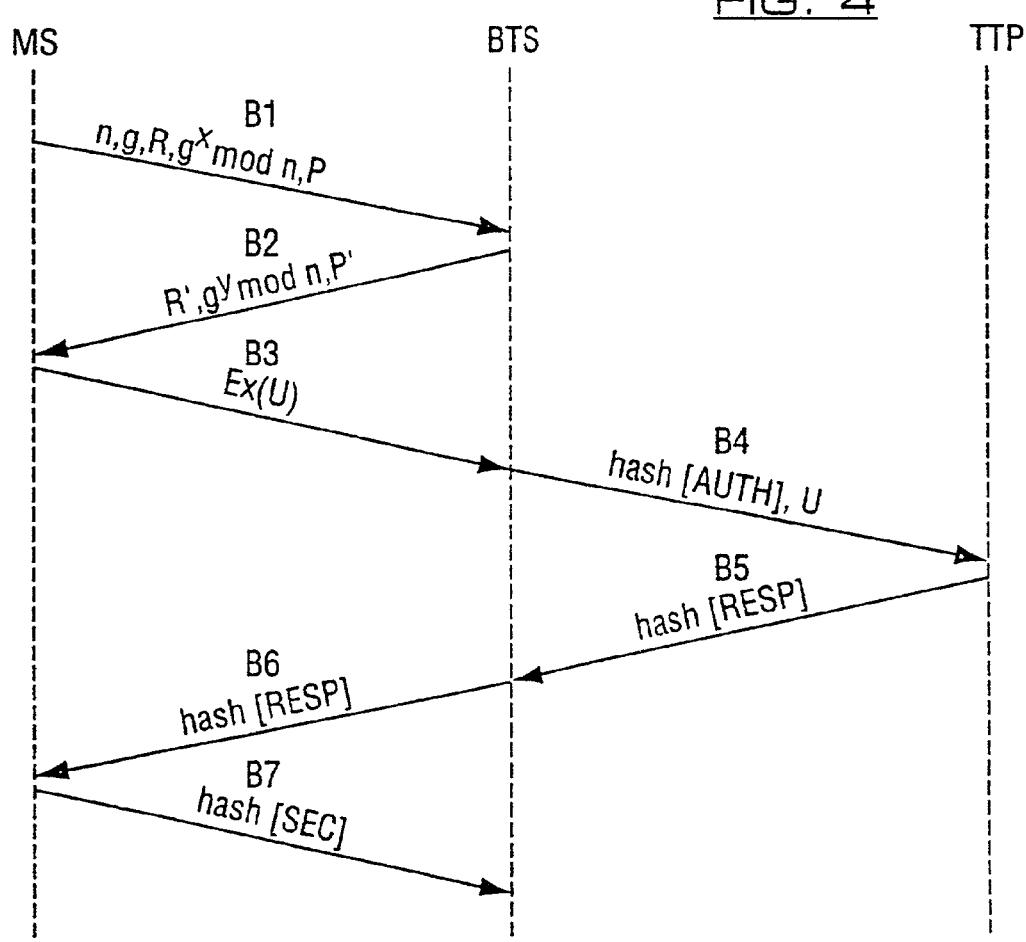
FIG. 4 illustrates a key exchange using a trusted third party embodying the present invention.

Reference will now be made to FIG. 4 which illustrates a key exchange using trusted third parties. As with the key exchange using signatures, the purpose is to exchange random numbers and to authenticate both parties.

This protocol starts in the same way as the last one with the mobile station in step B1 sending the values of n, g, the random number R, $g^x$mod n and parameters P to the base transceiver station. The base transceiver station then sends the random number R', $g^Y$mod n and parameter P' to the mobile station. A temporary key k is calculated from hash [TKEY] ($g^{xy}$mod n|R|R'). Unlike the key exchange using signatures, the key exchange is not authenticated before the encryption is turned on. In the third step, B3, the user identity U is sent from the mobile station to the base transceiver station in an encrypted form $E_k$ (U).

In the fourth step B4, the base transceiver station contacts a trusted third party TTP, for example a service provider of the user, using a connection which is assumed to be secure and authenticated. The base transceiver station BTS thus sends the trusted third party TTP a hash of the shared secret, the Diffie-Hellman public key parameters, the random numbers, the identity of the communicating parties and the security parameters. Thus, the base transceiver station BTS sends the following authenticating hash function to the trusted third party TTP:

$$hash[AUTH] \; (n|g|g^x|g^Y|g^{xy}|P|P'|R|R'|B|U)$$

The identity of the mobile user U is already known by the trusted third party. This may be achieved in any suitable way.

In embodiments of the present invention, it is preferred to send the hash of $g^{XY}$ rather than the encryption key k. As the encryption key k is probably shorter than $g^{XY}$, it is thus easier to attack. First shared secret data $g^{xy}$ mod n is assumed to be shared by the base station and the mobile but by no-one else. There is a second, long term, shared secret between the base station and the mobile phone which is distributed offline. This long term secret may be in the SIM card of the mobile phone or the like. The first secret $g^{xy}$ modn used to get a session key whilst the second secret is used so that the mobile phone is able to authenticate the base station.

In the fifth step B5, the trusted third party computes a hash of the secret from the shared secret data concatenated with hash [AUTH] which the base transceiver station sent thereto. A hash of the hash value calculated by the trusted third party is then calculated, again by the trusted third party. The trusted third party then sends this finally computed hash value to the base transceiver station which records this value. The value sent by the trusted third party to the base transceiver station is as follows:

$$hash[RESP] \; (hash[SEC] \; (S|hash[AUTH] \\ (n|g|g^x|g^Y|g^{xy}|P|P'|R|R'|B \; |U)))$$

The same value is then forwarded from the base transceiver station to the mobile station in the sixth step B6. The mobile station is able to compute the value of hash [SEC] directly. The mobile station then calculates hash [RESP] from hash [SEC] and thus compares the value of hash [RESP] (hash [SEC]) which it calculated with the value received from the trusted third party via the base transceiver station. If the two values of hash[RESP] (hash[SEC]) are the same, then she mobile knows that the home location register has authenticated the base transceiver station and the Diffie Hellman key exchange. If the two values hash[RESP] (hash [SEC]) are not the same, this indicates that there is an authentication problem or a man in the middle attack.

Finally, in the seventh step, B7, the mobile station sends the value of hash[SEC] without further hashing to the base station. The base transceiver checks whether or not hash [SEC] hashes to the same hash which the base station has received, i.e. hash[RESP]hash[SEC] from the trusted third party. If the value of hash[RESP]hash[SEC] received from the trusted third party is the same as that calculated by the base transceiver station, then the base transceiver station is able to determine that the mobile station was able to compute the correct hash [SEC] function and thus the mobile user is authenticated. At the same time, the Diffie-Hellman key exchange is also authenticated.

With both of the key exchanges described in relation to FIGS. 3 and 4, the Diffie-Hellman public parameters n and g can be left out of the first message if they are already known, for example if they are constants.

Figure 5:
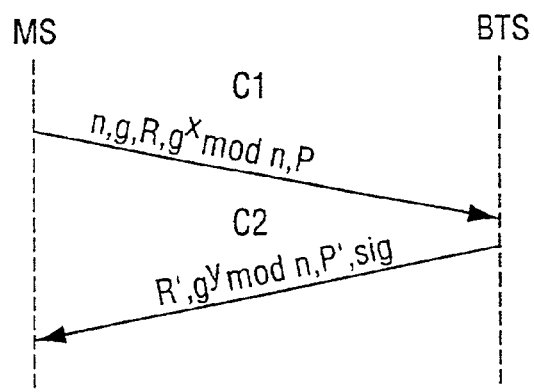
FIG. 5 illustrates a key exchange without using the identity of the mobile station, embodying the present invention.

Reference will now be made to FIG. 5 which illustrates a key exchange without requiring the identity of the mobile user. The purpose of this procedure is to distribute the shared secret and the random numbers between the mobile station and the base transceiver station and to authenticate the network. However, the mobile user is not authenticated and in fact remains anonymous.

In the first step C1, the mobile station sends to the base transceiver station exactly the same information which is sent in the first step of the key exchange using signatures as well as the key exchange using the trusted third party which are shown in FIGS. 3 and 4.

The base station then, in step C2, sends to the mobile station the same information which is sent in the key exchange using signatures (FIG. 3) and also signs the information. With this key exchange, the base station cannot be as sure as to the identity of the mobile station with which it is communicating. However, the signature by the base transceiver station ensures good key exchange. In other words, the unidentified mobile station can detect if there are any man in the middle of attacks and drop the connection if needed. The base station is not able to detect man in the middle attacks but it does not need to. In particular, the base station will not transmit security critical information to an unidentified party anyway. This can be used for access to public networks such as the internet where the identity of the mobile is not required.

Figure 6:
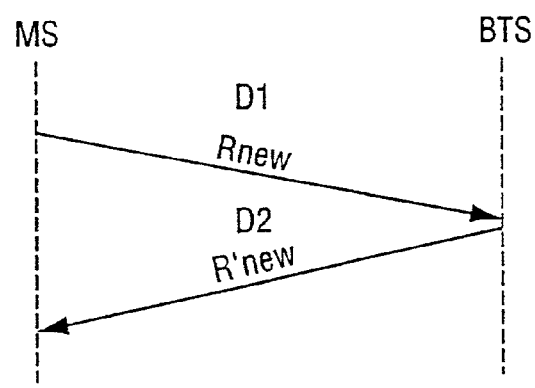
FIG. 6 illustrates rekeying without re-authentication, embodying the present invention.

Reference will now be made to FIG. 6 which shows a simple rekeying procedure without requiring new authentication. The purpose of this protocol is to distribute new random numbers in order to perform rekeying.

Re keying means that a new temporary key k for encryption purposes can be generated. To avoid the unauthorised deciphering of messages between the mobile station and the base station, rekeying should occur frequently.

In the first step D1, the mobile station sends to the base transceiver station the new random number $R_{new}$. In the second step D2, the base transceiver station transmits a second new random number $R'_{new}$ to the mobile station. With this particular protocol, it is not necessary that the random numbers be kept secret. However, the integrity of the random numbers should be protected. In other words, the random numbers should not be modified during their transmission between the mobile station and the base transceiver station. This is for issues of quality and not security. It is of course possible that the order of the two steps D1 and D2 can be reversed.

A new temporary key k can be derived from the equation hash[T] ($g^{xy}$mod n|R|R'). Thus, the original shared secret can be used in determining the new key. This is possible as the original shared secret $g^{xy}$mod n has never been used as a key in itself. Thus, the new key will be secure even if the old keys using the old random numbers in combination with the common shared secret have been compromised. It should also be appreciated that this protocol is secure even if the identities of the new random numbers have become public. This is because with the hash function, even if the identities of the random numbers are known, it is not possible to derive the shared secret nor the key.

Figure 7:
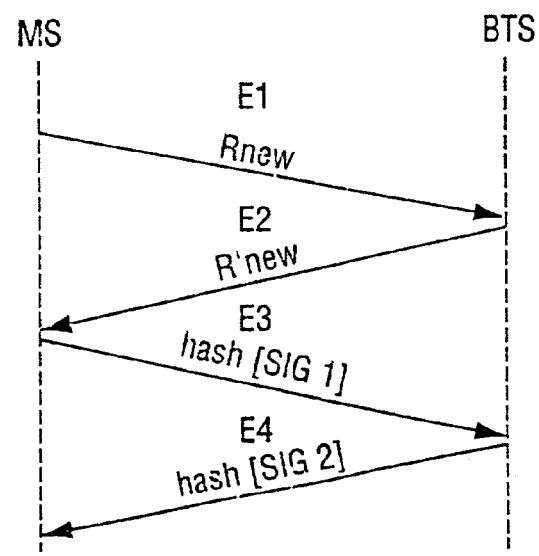
FIG. 7 illustrates rekeying with shared secret authentication, embodying the present invention.

Reference will now be made to FIG. 7 which shows a rekeying procedure which authenticates the parties. In the first step E1, the mobile station sends the new random number $R_{new}$ to the base transceiver station. In the second step E2, the base transceiver station sends a second new random number $R'_{new}$ to the mobile station MS. In the third step E3, the mobile station sends a hash signature to the base transceiver station having the following form: hash[SIG1] (n|g|$g^x$|$g^{xy}$|P|P'|$R_{new}$|$R'_{new}$|B|U).

The base station will calculate the value of hash[SIG1] and compare it with the value of hash[SIG1] which it has received from the mobile station. If the values are the same, then the new ; random numbers are authenticated as is the mobile station.

In the fourth step E4, the base transceiver station provides a hash value to the mobile station of the following form: hash[SIG2] (n|g|$g^x$|$g^y$|$g^{xy}$|P|P'|$R_{new}$ |$R'_{new}$|B). These values allows the random numbers to be authenticated by binding them to the current shared secret. The mobile station will verify the value of hash[SIG2]. If hash [SIG2] is verified, then the new random numbers are again authenticated as is the base station.

Figure 8:
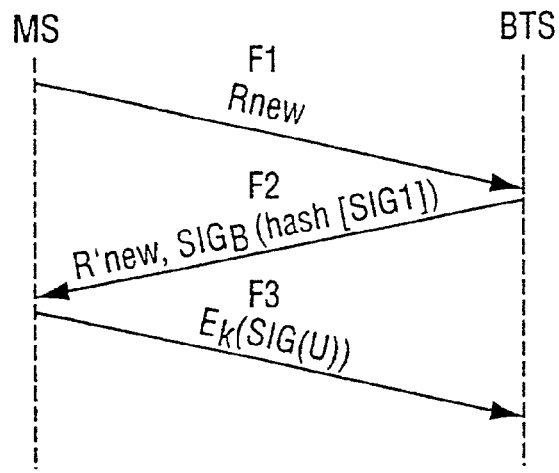
FIG. 8 illustrates rekeying with a signature authentication embodying the present invention.

Reference is now made to FIG. 8 which shows a rekeying protocol using signature authentication. In this procedure both parties are re-authenticated.

In the first step F1, the mobile station sends the new random number $R_{new}$ to the base transceiver station. In the second step, F2, the base transceiver station sends the second new random number $R'_{new}$ to the mobile station and signs a signature hash function as follows:

$SIG_B$(hash[SIG1] (n|g|$g^x$|$g^y$|$g^{xy}$|P|P'|$R_{new}$|$R'_{new}$|B))

The mobile station is able to calculate a new encryption key using these new random numbers as outlined hereinbefore. The mobile station is also able to authenticate the base station using a verification function.

The new encryption key k is therefore hash[TKEY] ($g^{xy}$mod n| Rnew| R'new). In the third step F3, the mobile station sends to the base transceiver station an encrypted signature of a hash function hash[SIG] having the following form: $E_k$($SIG_U$(hash[SIG2] (n|g|$g^x$|$g^y$|$g^{xy}$|P|P'|$R_{new}$|$R'_{new}$|B|U))). The signature sent by the mobile station is encrypted. This is not essential but may be more convenient with other information needs to be encrypted. The encryption uses the new encryption key k. The base station is able to authenticate the mobile station by verifying the signature. If the verification function is accepted, the mobile station is authenticated.

Figure 9:
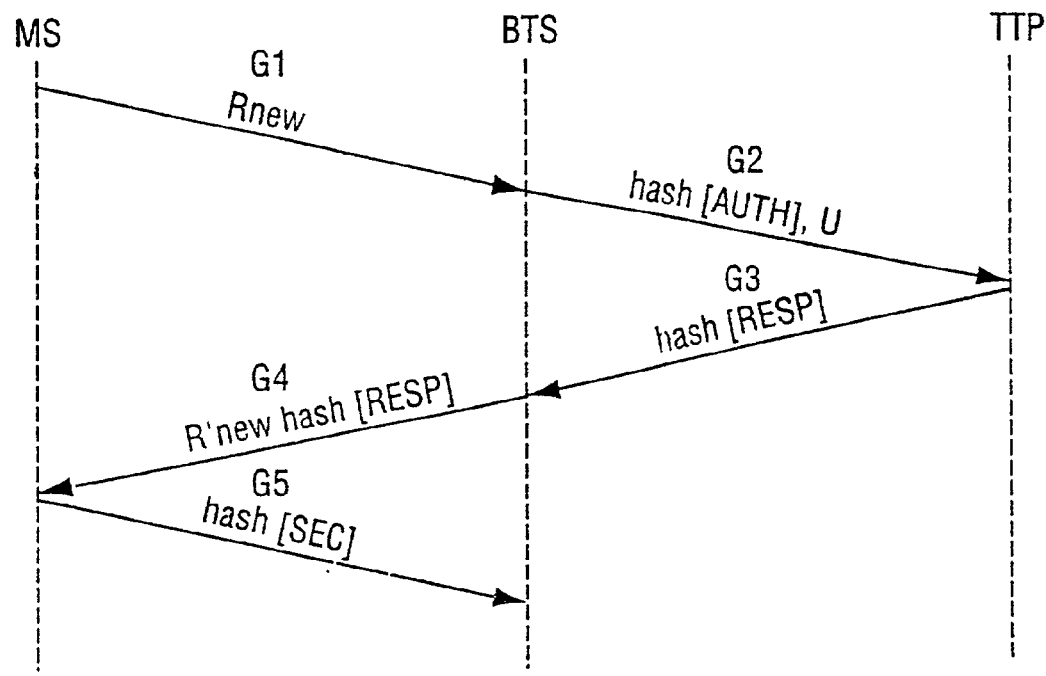
FIG. 9 illustrates rekeying using third party authentication embodying the present invention.

Reference will now be made to FIG. 9 which shows rekeying using third party authentication. In the first step G1, the mobile station sends to the base station the identity of the new random number $R_{new}$. In the second step G2, the base transceiver station sends to a trusted third party an authentication hash function hash[AUTH] (n|g|$g^x$|$g^y$|$g^{xy}$|p|p'$R_{new}$|$R'_{new}$|B|U) along with the mobile identity U. The authentication hash function includes a second new random number $R'_{new}$. As the connection between the base station and the trusted third party is secure, there is no need to encrypt the identity of the mobile station U. The trusted third party computes in the third step G3 a hash [RESP] of a hash of the shared secret S which includes the authentication hash function and the shared secret and sends this value to the base station. The authentication hash function is the same as that received from the base station.

In the fourth step G4, the base station sends to the mobile station the same value which the base station has received from the trusted third party along wish the value of the second new random number $R_{new}$. The mobile station computes the value of hash [SEC] using the new random number value and from that calculates a value for hash [RESP]. The mobile station checks whether or not the value which it got from the base transceiver station is equal to the value which it has computed. As in the key exchange using trusted third parties described hereinbefore with reference to god FIG. 4, if the values are the same, then the mobile station knows that the home location register has authenticated the base transceiver station and the key exchange.

The mobile station then sends in step G5 the value of hash [SEC], without further hashing to the base transceiver station. The base transceiver station then checks whether hash[SEC] received from the mobile station hashes to the same value which the base transceiver station received from the trusted third party. If it does, then the base transceiver station knows that the mobile was able to compute the hash[SEC] function and thus the user is authenticated.

In all of the rekeying processes described hereinbefore, the random numbers do not need to be kept secret.

As can be seen, there are 15 different messages that are used in the protocols. These messages are as follows:
1. n,g
2. R
3. R'
4. p
5. p'
6. $g^x$ mod n
7. $g^y$ mod n
8. n|g|$g^x$|$g^y$|$g^{xy}$|P|P'|R|R'|B
9. n|g|$g^x$|$g^y$|$g^{xy}$|P|P'|R|R'|B|U
10. $SIG_B$ (hash [SIG1] n|g|$g^x$|$g^y$|$g^{xy}$|P|P'|R|R'|B)
11. $E_k$ ($SIG_u$ (hash[SIG2] (n|g|$g^x$g|$g^y$|$g^{xy}$|P|P'|R|R'|B|U))
12. $E_k$(U)
13. hash[AUTH] (n|g|$g^{xy}$ mod n|R|R'|B|U), U
14. hash[RESP] (hash[SEC]|S|hash[AUTH] (n|g|$g^{xY}$ mod n|R|R'|B|U))
15. hash [SEC] (S|hash[AUTH] (n|g|$g^{xy}$ mod n|R|R'|B|U))

As it can be seen, some of these messages share a common structure namely messages 2 and 3, messages 4 and 5, and messages 6 and 7. This leaves a total of 12 different types of message. This protocol family is thus advantageous in that it allows a relatively large number of different protocols to be implemented using only a small number of different messages.

Thus, the various different methods outlined hereinbefore can define a family of methods made up of a limited number of messages. It is thus possible, in embodiments of the present invention, to select one of those methods. Various different criteria can be used in deciding which of the methods to use. For example, the different methods can be selected at random. A re-keying method may always be selected only if a key exchange method has been previously selected. The method may be selected depending on the processing capability of the first and/or second party (or the trusted third party when provided). The method can be selected in dependence on the amount of time since the last method was used. Alternatively, the method can be selected based on the function provided by the particular method eg, whether or not a trusted third party is used and whether or not authentication is required and if so what type of authentication.

In the arrangement described hereinbefore, the mobile station is described as communicating with the base transceiver station. It should be appreciated that the communication can in fact take place with any suitable element of the network although this communication will be via the base transceiver station. In other words, some of the calculations described as taking place in the base transceiver station in the preferred embodiments may take place in other parts of the network but will be transferred to the base transceiver station where appropriate. The mobile station can be replaced by any other suitable terminal whether fixed or mobile.

Figure 10:
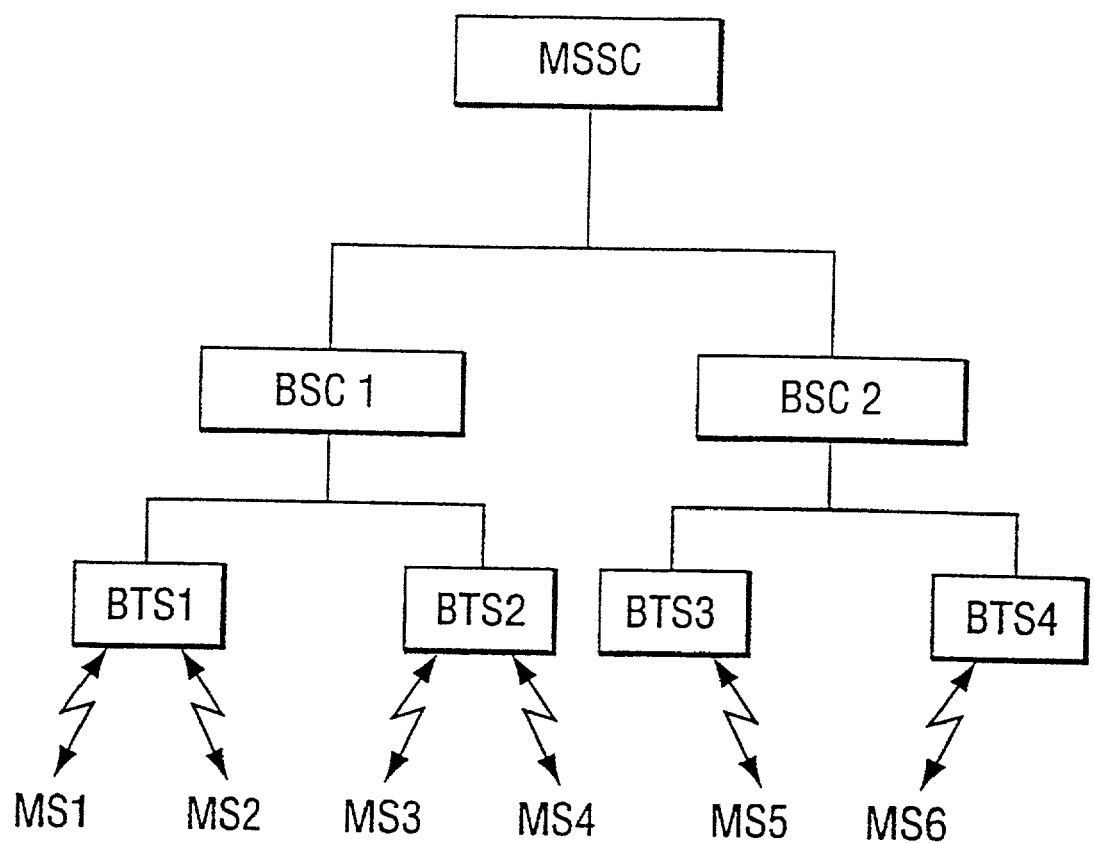
FIG. 10 shows part of the hierarchy of the network shown in FIG. 1.

Embodiments of the invention can be used with any suitable wireless cellular telecommunications network. Reference will now be made to FIG. 10 which shows the network hierarchy. The base stations BTS 1–4 are in communication with respective mobile stations MS 1–6s. In particular, the first base station BTS 1 is in communication with the first and second mobile stations MS 1 and 2. The second base station BTS 2 is in communication with the third and fourth mobile stations, the third base station BTS 3 is in communication with the fifth mobile station MS 5 and the fourth base station BTS 4 is in communication with the sixth mobile station MS 6. The first and the second base stations BTS 1 and 2 are connected to-a first base station controller BSC 1 whilst the third and fourth base stations BTS 3 and 4 are connected to a second base station controller BSC 2. The first and second base station controllers BSC 1 and 2 are connected to a mobile services switching centre MSSC.

In practice a plurality of mobile services switching centres are provided each of which is connected to a number of base station controllers. Usually more than two base station controllers are connected to a mobile services switching centre. More than two base stations may be connected to each base station controller. Of course many more than two mobile stations will be in communication with a base station.

The decision as to which of the method is used can be taken in any one or more of the network elements shown in FIG. 10. For example, the decision may be made in a mobile station, a base transceiver station, an authentication centre, a mobile services switching centre or the like. Alternatively or additionally, the decision may be taken by any other suitable element. An element dedicated to determining the method to be used may be provided.

The trusted third party may be the base station controller, the mobile services switching centre or another element.

Embodiments of the present invention may also be used in other situations which require authentication such as other types of wireless communication or communications which use fixed wire connections. Embodiments of the present invention are not just applicable to communication networks but are also applicable to point to point connections be they wired or wireless connections.

The invention claimed is:

1. A method of securing communication between a first party and a second party in a telecommunications network comprising the steps of:
   defining a criteria for selecting one of a plurality of different security methods, the plurality of security methods each comprising a plurality of messages selected from a set of message types, at least two different security methods having at least one message in common;
   selecting one of the said plurality of different security methods in accordance with said defined criteria: and
   performing said security method.

2. A method as claimed in claim 1, wherein said criteria is to Select the security method is selected at random.

3. A method as claimed in claim 1, wherein said criteria is to select said security method based on the processing capability of the first and/or second party.

4. A method as claimed in claim 1, wherein said criteria is to select the security method in dependence on the amount of time since the last security method was performed.

5. A method as claimed in claim 1, wherein said criteria is to select the security method based on the function provided by the security method.

6. A method as claimed in claim 1, wherein the plurality of security methods comprise at least one authentication method and/or at least one rekeying method.

7. A method as claimed in claim 6, wherein at least one authentication method includes a key exchange to create a shared secret.

8. A method as claimed in claim 6, wherein a rekeying method is performed after an authentication method.

9. A method as claimed in claim 6, wherein a rekeying method is carried out without authentication.

10. A method as claimed in claim 6, wherein the rekeying method is authenticated.

11. A method as claimed in claim 10, wherein the set of messages includes at least one of the following message types:
at least one random number message; at least one hash function message; at least one signature function message; at least one parameter for use with a given function message; at least one security parameter message; at least one key for a given function message; at least one encoded message; at least one message to and/or from at least one third party; and at least one authentication response message.

12. A method as claimed in claim 11 wherein the set of messages includes the following message types: one signature function message; two security parameter messages; two random number messages; one encoded signature function message; one encoded user identification message; two parameters for use with given function messages; two hash function messages; one contact message with a third party; one response message from the third party; one authentication response message; and two public parameters for the given function.

13. A method as claimed in claim 12, wherein the set of messages are as follows:
1. n,g
2. R
3. R'
4. P
5. P'
6. $g^x \bmod n$
7. $g^y \bmod n$
8. hash [SIG 1]$(n|g|g^x|g^y|g^{xy}|P|P'|R|R'|B)$
9. hash [SIG 2]$(n|g|g^x|g^y|g^{xy}|P|P'|R|R'|B)$
10. $SIG_B$(hash [SIG1]$n|g|g^x|g^y|g^{xy}|P|P'|R|R'|B$)
11. $E_K(SIG_U($hash [SIG2]$(n|g|g^x|g^y|g^{xy}|P|P'|R|R'|B|U))$
12. $E_K(S_U)$
13. hash [AUTH] $(n|g|g^{xy} \bmod n|R|R'|B|U)$, U
14. hash [RESP] (hash [SEC]$S|$hash [AUTH]$(n|g|g^{xy} \bmod n|R|R'|B|U))$
15. hash [SEC] ($S|$hash [AUTH] $(n|g|g^{xy} \bmod n|R|R'|B|U))$
where n and g are Diffie Hellman public parameters, R and R' are random numbers, P and P' are security parameters, g is a generator of the Diffie Hellman exchange, x and y are random exponents, n is the modulus of the Diffie Hellman key exchange, B and U are the identity of the first and second parties, SIG represents a signature, $E_k$ represents encryption, AUTH represents authentication.

14. A method as claimed in claim 11, wherein a first security method uses the following messages: the first and second keys for a given function messages; first and second random number messages, first and second security parameter messages, a signature function message, one encoded user identification message and optionally at least two parameters for use with a given function message.

15. A method as claimed in claim 11 wherein a second security method uses first and second random number messages, first and second security parameter messages, first and second keys for a given function messages, a signature function message and optionally first and second parameters for use with the given function message.

16. A method as claimed in claim 11 wherein a third security method uses first and second random number messages, first and second security parameter messages, first and second keys for given function messages, one encoded user identification message, one message to and one message from a third party, one authentication response message and optionally first and second parameters for use with a given function message.

17. A method as claimed in claim 11 wherein said security method is a first rekeying method and comprises first and second random number messages.

18. A method as claimed in claim 11 wherein the security method is a second rekeying method and uses first and second random number messages and first and second hash function messages.

19. A method as claimed in claim 11 wherein the security method is a third rekeying method comprising first and second random number messages, a signature function message and an encoded message.

20. A method as claimed in claim 11, wherein one security method is a fourth rekeying method and comprises the use of first and second random number messages, one message to and one message from the third party and one authentication response message.

21. A method as claimed in claim 11, wherein the given function is a Diffie-Hellman function.

22. A method as claimed in claim 11, wherein at least one of said messages types comprises two messages, one message being from the first party and the other message being from the second party.

23. A method as claimed in claim 11, wherein the encoded message is used to transfer information as to the identity of at least one of the first and second parties to the other of the first and second parties.

24. A method as claimed in claim 11, wherein at least one of said first and second parties is arranged to communicate with a trusted third party and is arranged to receive messages from and/or send messages to that trusted third party.

25. A method as claimed in any of claims 11, wherein the exchange of messages between the first and second parties permits a shared secret to be created which is used to authenticate the communication between the parties.

26. A method as claimed in claim 6, wherein at least one rekeying method comprises the steps of exchanging at least one random number between the first and second parties.

27. A method as claimed in claim 26, wherein at least one of the random numbers is authenticated.

28. A method as claimed in claim 1, wherein at least one of said first and second stations comprises a mobile station.

29. A method as claimed in claim 28, wherein at least one of the first and second stations comprises a base station.

30. A wireless telecommunication system comprising a first station and a second station with means adapted for performing all of the steps of the method according to claim 1.

31. A telecommunications network element for securing communication between a first party and a second party comprising:
- means for defining a criteria for selecting one of a plurality of different security methods, the plurality of security methods each comprising a plurality of messages selected from a set of message types, at least two different security methods having at least one message in common;
- selection means for selecting one of said plurality of different security methods in accordance with said defined criteria; and
- means for ensuring that the communication between said first and second parties is in accordance with said selected security method.

32. A terminal for securing communications between a first party and a second party comprising:
- means for defining a criteria for selecting one of a plurality of different security methods, the plurality of security methods each comprising a plurality of messages selected from a set of message types, at least two different security methods having at least one message in common;
- selection means for selecting one of said plurality of different security methods in accordance with said defined criteria; and
- means for ensuring that the communication between said first and second party is in accordance with said selected security method.

33. A system for securing communications between a first party and a second party comprising:
- means for defining a criteria for selecting one of a plurality of different security methods, the plurality of security methods each comprising a plurality of messages selected from a set of message types, at least two different security methods having at least one message in common;
- selection means for selecting one of said plurality of different security methods in accordance with said defined criteria; and
- means for ensuring that the communication between said first and second party is in accordance with said selected security method.

34. A computer program product comprising computer-readable code, the computer-readable code causes a computer to perform a procedure for securing communications between a first party and a second party comprising:
- means for defining a criteria for selecting one of a plurality of different security methods, the plurality of security methods each comprising a plurality of messages selected from a set of message types, at least two different security methods having at least one message in common;
- selection means for selecting one of said plurality of different security methods in accordance with said defined criteria; and
- means for ensuring that the communication between said first and second party is in accordance with said selected security method.

35. A method of securing communication between a first party and a second party in a telecommunications network comprising the steps of:
- defining a criteria for selecting one of a plurality of different security methods each having a different set of steps for performing the respective security methods, the plurality of security method each comprising a plurality of messages selected from a set of message types, at least two different security methods having at least one message in common;
- selecting one of the said plurality of different security methods in accordance with said defined criteria; and
- performing said security method.

36. A method of securing communication between a first party and a second party in a telecommunications network comprising the steps of:
- defining a criteria for selecting one of a plurality of different security methods, the plurality of security method each comprising a plurality of messages selected from a set of message types, at least some of the different security methods having different message types and at least two different security methods having at least one message in common;
- selecting one of the said plurality of different security methods in accordance with said defined criteria; and
- performing said security method.

* * * * *